US009855517B2

(12) United States Patent
Rock et al.

(10) Patent No.: US 9,855,517 B2
(45) Date of Patent: Jan. 2, 2018

(54) WASTE LIQUID SOLIDIFICATION SYSTEM AND METHOD

(71) Applicant: SST Systems, Inc., Sturgeon Bay, WI (US)

(72) Inventors: Robert G. Rock, Sturgeon Bay, WI (US); Abigail Grommet, Sturgeon Bay, WI (US)

(73) Assignee: SST Systems, Inc., Sturgeon Bay, WI (US)

( * ) Notice: Subject to any disclaimer, the term of this patent is extended or adjusted under 35 U.S.C. 154(b) by 303 days.

(21) Appl. No.: 14/695,784

(22) Filed: Apr. 24, 2015

(65) Prior Publication Data

US 2016/0311000 A1 Oct. 27, 2016

(51) Int. Cl.
*B01D 15/10* (2006.01)

(52) U.S. Cl.
CPC .................................... *B01D 15/10* (2013.01)

(58) Field of Classification Search
CPC ...................................................... B01D 15/10
USPC ..................... 366/137.1, 167.1, 173.1, 173.2
See application file for complete search history.

(56) References Cited

U.S. PATENT DOCUMENTS 2,746,728 A * 5/1956 Pomerleau .............. B01F 5/205
169/15
4,086,663 A * 4/1978 Croft ..................... B01F 5/0256
366/137.1
5,304,709 A 4/1994 Babcock et al.
6,808,515 B2 10/2004 Takahashi et al.
7,091,253 B2 8/2006 Dairoku et al.
8,598,405 B2 12/2013 Masuda et al.
2004/0144682 A1 7/2004 Altmayer
2008/0004477 A1* 1/2008 Brunsell ................. G21F 9/167
588/6
2011/0094971 A1 4/2011 Joh et al.

FOREIGN PATENT DOCUMENTS

CN 201052972 Y 4/2008
CN 100588621 C 2/2010

OTHER PUBLICATIONS

Pro Shield M9910 Material Safety Data Sheet of TTX Environmental. Publicly available prior to Apr. 24, 2015 (7 pages).

* cited by examiner

*Primary Examiner* — David Sorkin
(74) *Attorney, Agent, or Firm* — Michael Best & Friedrich LLP

(57) ABSTRACT

A waste liquid solidification system includes a chamber at least partially enclosing a volume, a liquid outlet positioned to spray a liquid into the volume, and a powder outlet adjacent the liquid outlet positioned to discharge a super-absorbent polymer powder into the volume. The liquid outlet and powder outlet are configured such that the liquid and the super-absorbent polymer powder undergo airborne mixing within the volume enclosed by the chamber to create a solid waste.

5 Claims, 5 Drawing Sheets

WASTE LIQUID SOLIDIFICATION SYSTEM AND METHOD

The present invention relates to waste liquid solidification, and more particularly to a waste liquid solidification system that utilizes super-absorbent polymer (SAP).

Some facilities produce liquid waste that cannot be pumped into local sewer systems due to municipal, local, state, and/or federal regulations. Typically, this kind of liquid waste is shipped to liquid waste processing plants. However, this process can be cost inefficient in certain scenarios. On the other hand, disposal of solids is often much easier and more cost effective. In many cases, this is due at least in part to the fact that properly-solidified solid waste can be less likely to leech into the ground and other environment of the disposed waste—a result that can cause negative environmental effects.

SUMMARY

In one aspect, the invention provides a waste liquid solidification system including a chamber at least partially enclosing a volume, a liquid outlet positioned to spray a liquid into the volume, and a powder outlet adjacent the liquid outlet positioned to discharge a super-absorbent polymer powder into the volume. The liquid outlet and powder outlet are configured such that the liquid and the super-absorbent polymer powder undergo airborne mixing within the volume enclosed by the chamber to create a solid waste.

In another aspect, the invention provides a method of solidifying waste liquid. A stream of waste liquid and a stream of super-absorbent polymer powder are simultaneously provided to a mixing chamber such that particles of the waste liquid stream and particles of the super-absorbent polymer powder stream are mixed while airborne to solidify the waste liquid particles without any physical mixing or agitation. A quantity of solidified waste liquid is collected at a bottom portion of the mixing chamber. The quantity of solidified waste liquid is ejected from the mixing chamber.

Other aspects of the invention will become apparent by consideration of the detailed description and accompanying drawings.

DETAILED DESCRIPTION

Before embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

The waste liquid solidification system described herein is used to convert liquid waste into solid waste. This process can significantly reduce costs associated with liquid waste shipping, processing, and/or disposal. Solid waste may include rigid solid material as well as semi-solid (i.e., gelatinous) material. The waste liquid solidification system utilizes a super-absorbent polymer (SAP) in the form of a fine powder that absorbs liquid waste to create a solid waste. SAP can instead be found in other forms such as beads and crystals, and in some embodiments can be resiliently compressible. The composition of the SAP powder may be matched to the particular type of liquid waste being handled and may be selected based on one or more desirable properties of the final solid waste. The SAP powder may absorb liquid waste by chemical means, physical means, or a combination thereof. The SAP powder may absorb and retain approximately 500 lbs. of liquid waste for every 20 lbs. of SAP powder used. The SAP powder may be a Waste Solidification Polymer, such as sodium polyacrylate available from Therma-Tron-X, Inc. of Sturgeon Bay, Wis. under the product name PRO SHIELD M9910. The SAP powder can be effective on both water-based waste and oil-based waste, by solidifying the liquid waste with coagulation chemicals, particularly by congealing, gelling, or coalescing.

Figure 1:
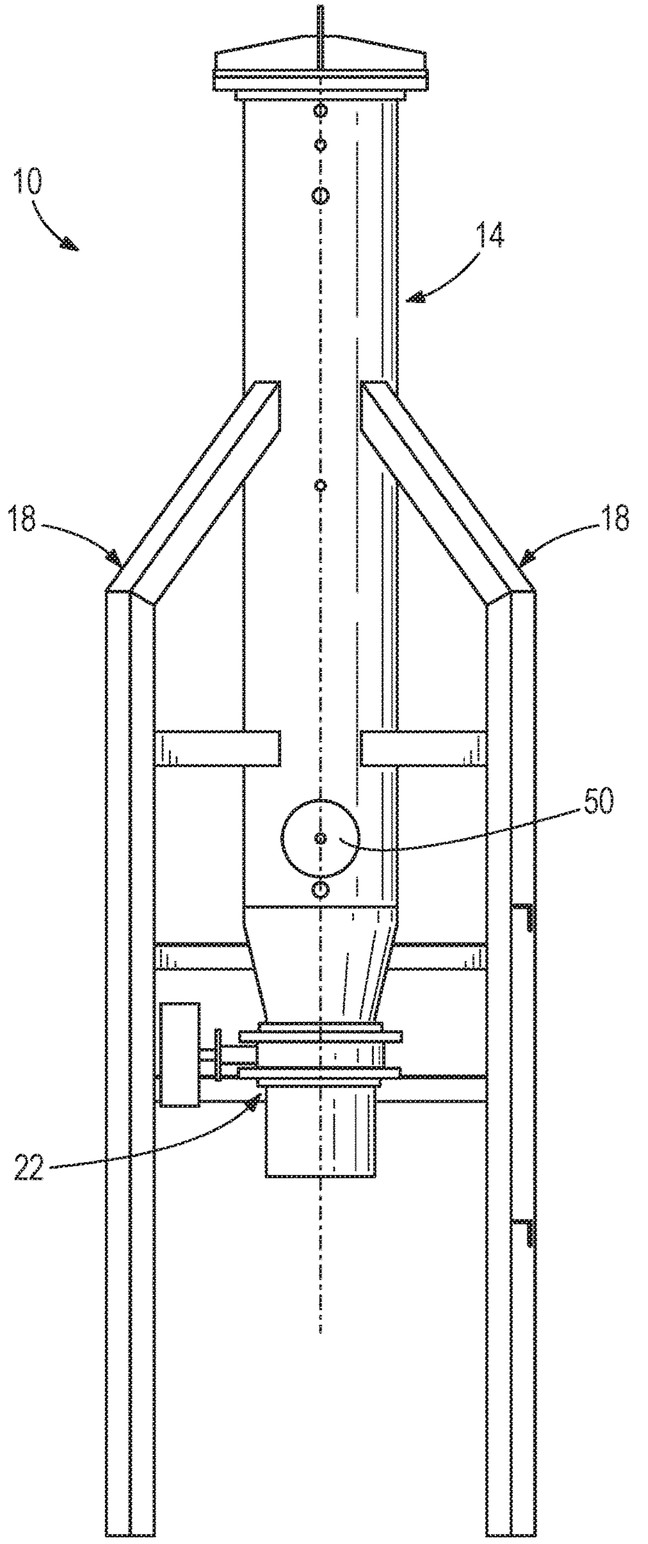
FIG. 1 is a front view of a waste liquid solidification device for use in a system according to one aspect of the invention.

FIG. 1 illustrates a waste liquid solidification device 10 for use in a waste liquid solidification system according to one aspect of the invention. The device 10 includes a mixing tank or chamber 14 held in an upright or vertical orientation with respect to the ground by a plurality of supporting legs 18 attached to the sides of the mixing chamber 14. The supporting legs 18 hold the mixing chamber 14 above the ground in a spaced relationship such that solid waste may be evacuated out of the bottom of the mixing chamber 14. The volume defined by the mixing chamber 14 is configured to receive liquid waste and SAP powder from respective liquid and powder outlets 30, 34 positioned within the mixing chamber 14 to create a batch of solid waste from a quantity of liquid waste pumped from a liquid waste reservoir 35 to the mixing chamber 14. The mixing chamber 14 also incorporates a filtration system to help regulate the internal pressure of the system and avoid ejecting the SAP powder into the surrounding environment. The filtration system can include a filter housing 36 with one or more filtration elements 36A or filtration media suitable for entrapping the particles of the SAP powder so that the SAP powder is contained within the system and not released to the surrounding environment. The filter housing 36 can include a first inlet coupled to the mixing chamber 14 (e.g., via a valve and/or hose) and can further include a second inlet coupled to a powder reservoir or hopper 38 from which the SAP powder is pumped to the mixing chamber 14. Alternately, or in addition, air or another pressurized gas source may flow from one or both of the powder hopper 38 and the mixing chamber 14 through a cyclonic separator to separate the powder from the gas stream and prevent the escape of the SAP powder.

The device 10 also includes an outlet valve 22 located on a lower or bottom end of the mixing chamber 14 that may cooperate with an ejection system, to eject each batch of solid waste, once finished. The device 10 may also include one or more access flanges 50 adjacent a lower side of the chamber 14 and located above the outlet valve 22 to provide access to the internal volume of the chamber 14 for maintenance or cleaning. In some constructions, the device 10, including the supporting legs 18, may stand approximately 15 feet tall at its highest point, with the mixing chamber 14 being approximately 1.5 feet to 2 feet in diameter. However, the size and/or shape of the device 10 and the features thereof (e.g., the mixing chamber 14) may vary based on different applications and should not be regarded as limiting. Further, while a vertically-oriented mixing chamber 14 may have particular benefits, such that gravity assists with evacuation of the solid waste, the orientation of the device (i.e., vertical, horizontal, etc.) may vary among particular applications.

Figure 2:
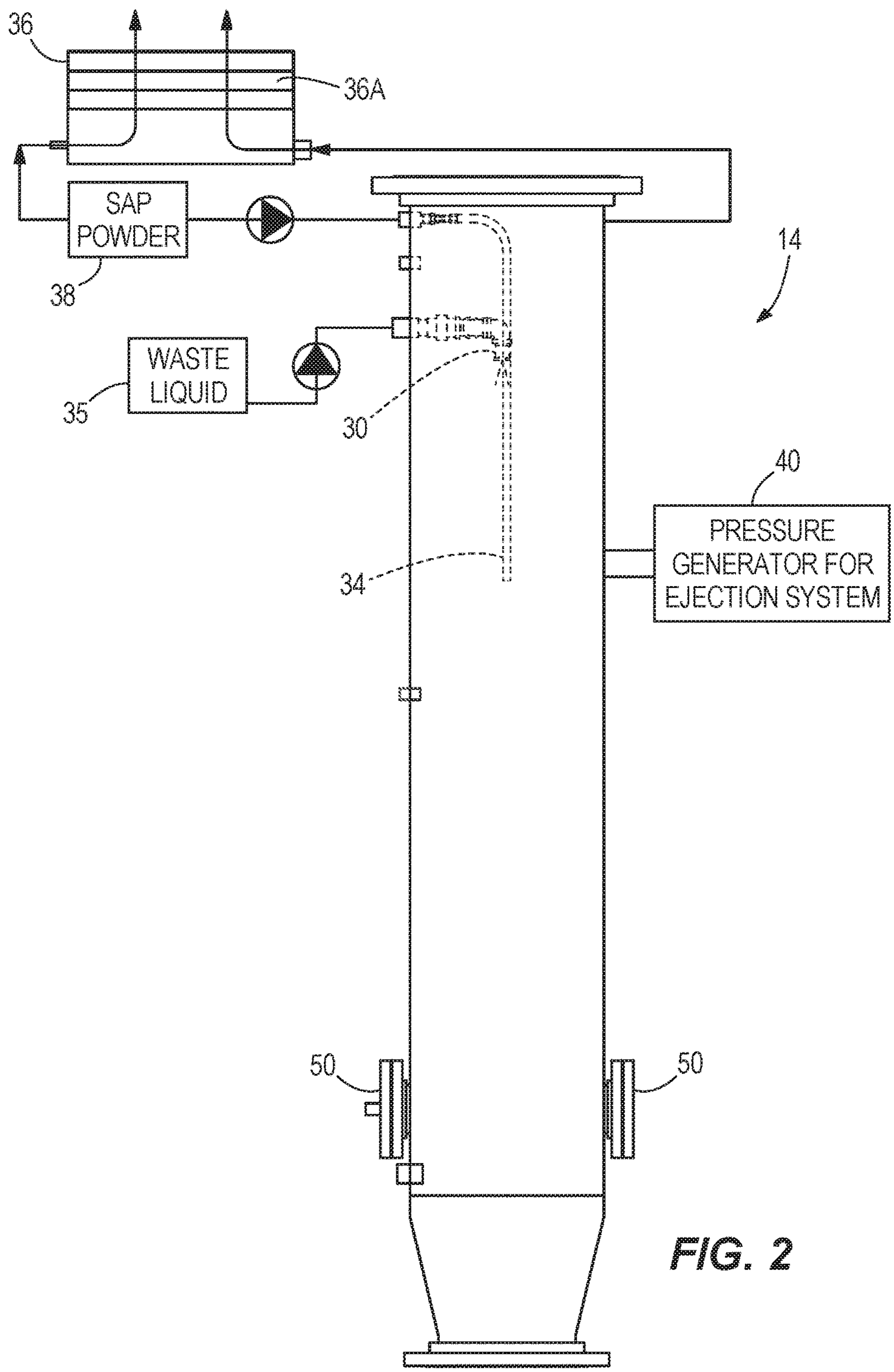
FIG. 2 is a side view of a mixing chamber of the waste liquid solidification device of FIG. 1, schematically illustrating a powder and liquid supplies, a pressure generator, and a filtration system coupled thereto.
Figure 3:
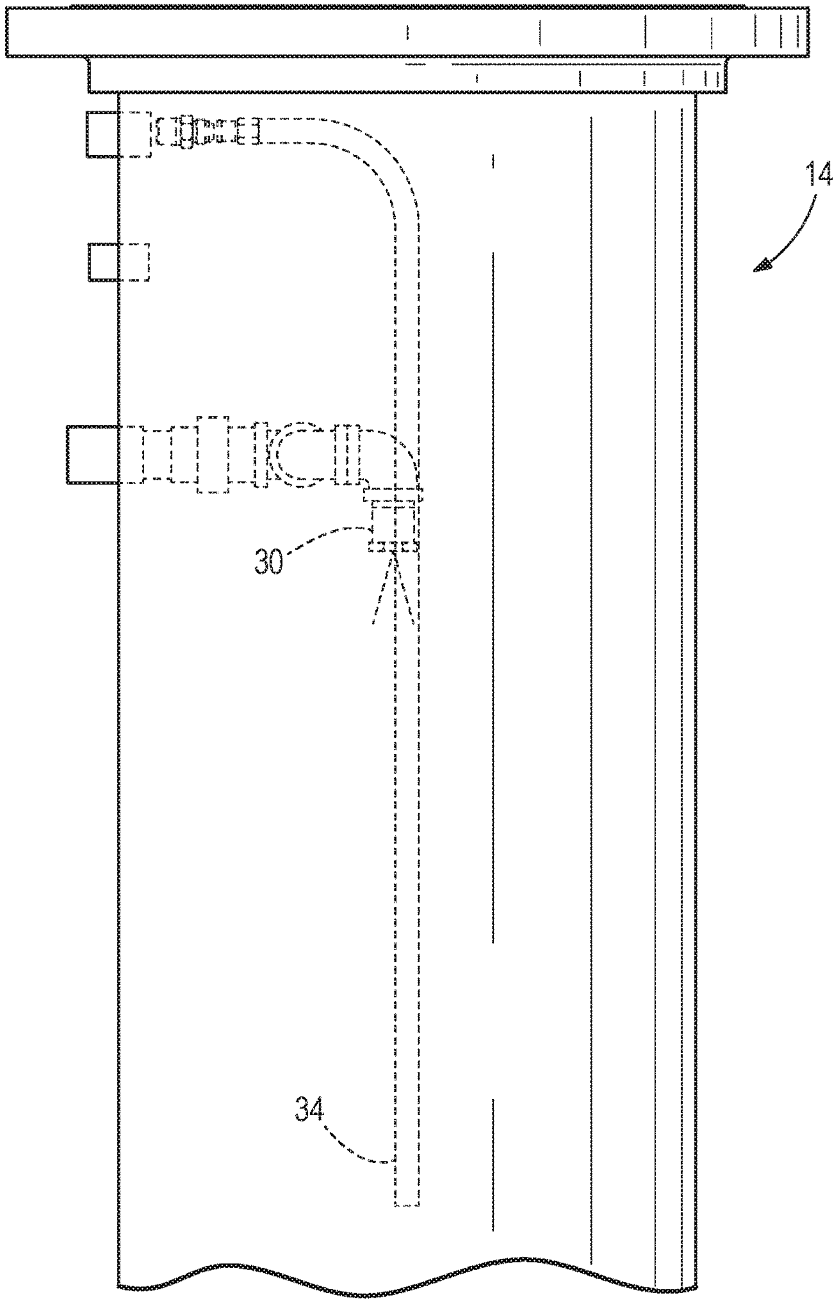
FIG. 3 is an enlarged view of a portion of the mixing chamber shown in FIG. 2, illustrating liquid and powder outlets.
Figure 4:
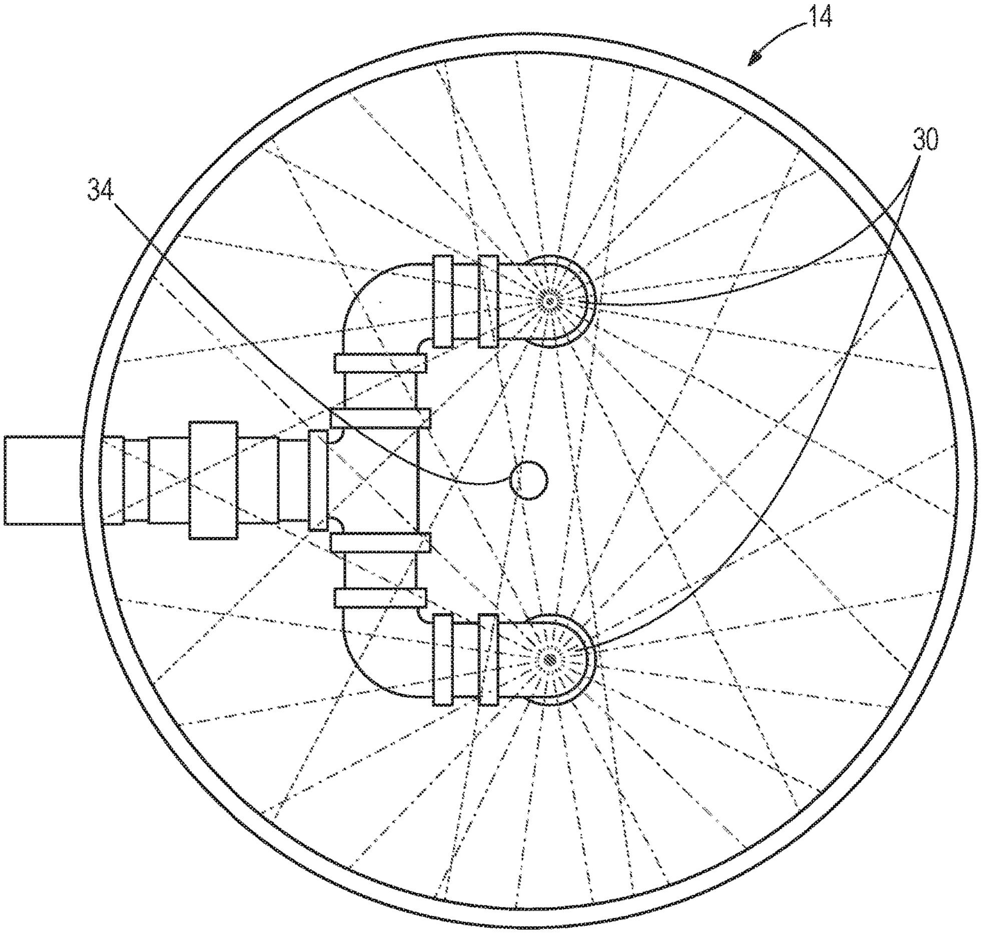
FIG. 4 is a cross-sectional top view of the mixing chamber as shown in FIG. 2, illustrating the liquid and powder outlets.

As illustrated in FIGS. 2-4, the mixing chamber 14 encloses a volume for mixing liquid waste supplied by the pair of liquid outlets 30 with the SAP powder discharged from the powder outlet 34. The mixing chamber 14 is lined with a smooth chemical-resistant (e.g., epoxy) coating on internal sidewalls. The liquid outlets 30 and the powder outlet 34 are arranged in close proximity such that the SAP powder absorbs and retains the liquid waste particles in the air as both substances are discharged from their respective outlets 30, 34. No additional mixing (e.g., stirring, agitating, swirling, etc.) is carried out. In the illustrated embodiment, the powder outlet 34 is centered between and located just below the liquid outlets 30 (FIGS. 3 and 4), for example, about 6 inches below the liquid outlets 30. The liquid outlets 30 may spray the liquid waste in a particular pattern (e.g., conical, mist, etc.) to facilitate mixing. The SAP powder discharged from the powder outlets 34 is released in a fine mist or cloud of particles due to the fine nature of the SAP powder when pumped with air. This arrangement facilitates the airborne mixing of the liquid waste particles and the SAP powder particles. Furthermore, the liquid outlets 30 may define overlapping spray patterns as schematically illustrated in FIG. 4 by respective groups of radial lines emanating from each of the liquid outlets 30. The overlapping spray patterns encompass the entire cross-section of the mixing chamber 14 to contain the SAP powder below the level of the liquid spray. In some constructions, each one of the liquid outlets 30 defines a spray pattern that encompasses the entire cross-section of the mixing chamber 14. A nozzle may be provided at each of the liquid outlets 30 to define the spray pattern. The nozzles may take a variety of different forms, and in some constructions, may be adjustable to vary the spray pattern. The solid waste created from the airborne mixing of the liquid waste and the SAP powder collects in the lower half of the mixing chamber 14 until a batch is finished. The batch may be considered finished when a predetermined amount of solid waste is accumulated in the mixing chamber 14. Various sensors (e.g., weight, height, etc.) may be used to determine when a batch is finished and ready for evacuation. Alternatively, or in addition, the solidification system supplies only a predetermined amount of SAP powder and a predetermined amount of liquid waste to the device 10 per batch based on the capacity of the mixing chamber 14 or other parameters.

Once a batch of liquid waste has been converted to solid waste, the solid waste is evacuated out of the lower side of the mixing chamber 14, through the outlet valve 22, and into a container (e.g., bag) that may then be shipped to a solid waste disposal facility. In one embodiment, gravity alone causes the solid waste to exit through the outlet valve 22. In another embodiment, an ejection system may pressurize the internal volume of the mixing chamber 14 via a pressure generator 40 (FIG. 2) to push the solid waste out of the valve 22 under force of the pressurized chamber (and gravity, if vertically-oriented). In other embodiments, an ejection pushing force may be created by a mechanical apparatus (e.g., a piston, squeegee, etc.) that may be actuated to push the solid waste from the mixing chamber 14 (FIGS. 5 and 6) and/or break the surface tension at the wall of the mixing chamber 14. In some constructions, the solidification system includes mechanical means (e.g., a forklift, crane, conveyor, etc.) to receive and transport the ejected solid waste.

Figure 5:
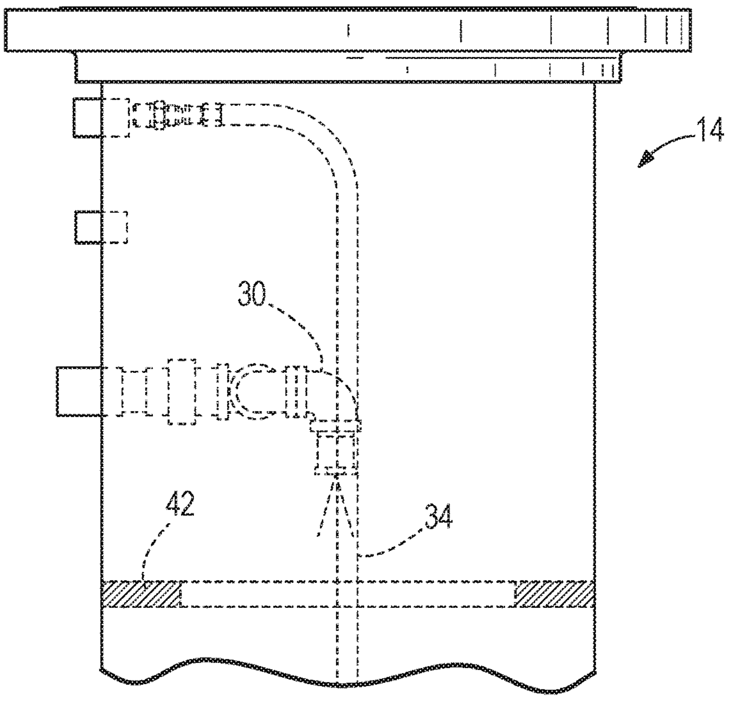
FIG. 5 is an enlarged view of a portion of the mixing chamber as shown in FIG. 2, illustrating the liquid and powder outlets in combination with an annular piston.
Figure 6:
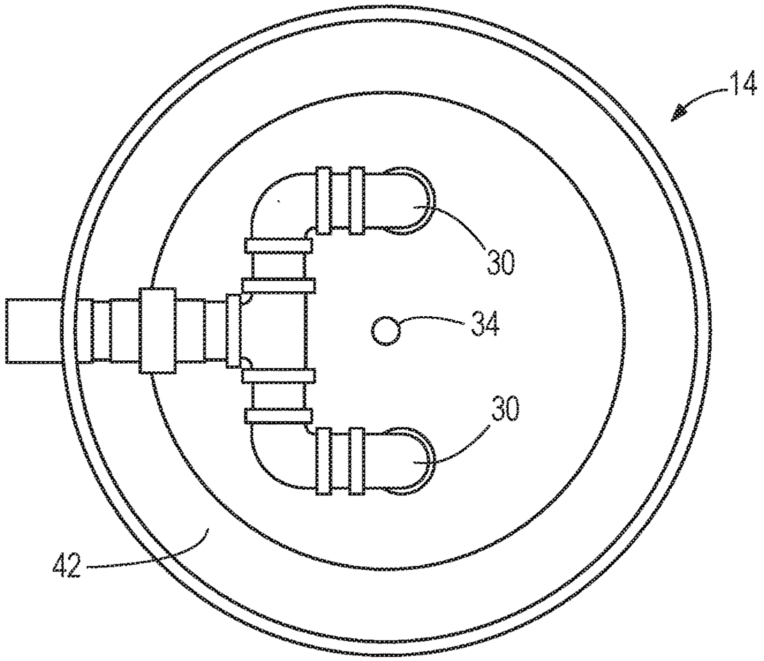
FIG. 6 is a cross-sectional top view of the mixing chamber as shown in FIG. 2, illustrating the liquid and powder outlets in combination with the annular piston of FIG. 5.

As shown in FIGS. 5 and 6, an annular piston 42 is illustrated as an example of a mechanical ejection-assisting apparatus. The annular piston 42 may include an elastomeric outer edge that can wipe away residue on the internal sidewall of the mixing chamber 14. The annular piston 42 is movable along an axis (e.g., vertical central axis as shown in FIG. 1) of the chamber 14 for wiping away any residue build-up, as illustrated in FIG. 5. The annular shape of the piston 42 allows the SAP powder, the liquid waste, and any created solid waste to freely flow and/or fall through an open central portion of the piston 42 (FIG. 6) without creating a significant disruption to the airborne mixing process. An alternate device may include one or more wipers or squeegees arranged directly along the interior wall of the mixing chamber 14, and having a length extended along at least a majority of a length of the mixing chamber 14 below the powder outlet 34, and in some cases along the entire length of a cylindrical wall portion of the mixing chamber 14 below the powder outlet 34. The wiper(s) can be rotatable about the central axis of the mixing chamber 14 by a driving mechanism (not shown) to release the adhesion between the mixing chamber wall and the solidified waste so that the waste may be more easily ejected. The wiper(s) can be oriented parallel to the central axis of the mixing chamber 14 or angled slightly (e.g., less than 30 degrees).

Additionally, the system may include a containerizing (e.g., bagging) system to partially or fully automate the evacuation and disposal process.

In operation, liquid waste is accumulated in one or more waste liquid reservoirs 35 until a large enough quantity is collected for a batch of solid waste to be created using the waste liquid solidification device 10. Alternatively, a quantity of liquid waste can be collected elsewhere and brought to the solidification system. Once enough liquid waste is available to run a cycle of the device 10, the device 10 is turned on and the liquid waste is ejected through the liquid outlets 30 as the SAP powder is discharged from the powder outlet 34. The liquid waste and the SAP powder mix in the air to form the solid waste. The solid waste is held within the mixing chamber 14 until the batch of solid waste is completed. Once the batch is completed, the liquid outlets 30 and the powder outlet 34 are turned off or closed and the outlet valve 22 is opened to allow for the solid waste to be evacuated (i.e., via the powered ejection system and/or by gravity). If the ejection system is used, the ejection system is actuated (i.e., the chamber 14 is pressurized or the mechanical ejection system is actuated) to push the solid waste out of the mixing chamber 14 through the outlet valve 22. The solid waste can be received by any suitable container or conveyance for handling and optionally shipping purposes. To remove any additional residue that may be left on the internal sidewall of the chamber 14, the annular piston 42 or other device may be moved along the chamber wall again to scrape or wipe away the residue to help keep the mixing chamber 14 clean after each batch is processed. The device 10 is then powered down until the next batch is ready to be created. Alternatively, the waste liquid solidification device 10 may be automatically actuated by a control system that senses when a batch is ready to be started and/or when a batch is finished. For example, the device 10 may include a sensor (e.g., height/level, weight, flow, timed, etc.) that determines the quantity of solid waste held within the chamber 14. In some constructions, a system may be operated in continuous operation with multiple mixing chambers 14, rather than a single batch-operated mixing chamber as shown. The total capacity of a plurality of mixing chambers 14 can be matched to an incoming flow of waste liquid from a process or source.

Various features and advantages of the invention are set forth in the following claims.

What is claimed is:

1. A method of solidifying waste liquid, the method comprising:

simultaneously providing a stream of waste liquid and a stream of super-absorbent polymer powder to a mixing chamber such that particles of the waste liquid stream and particles of the super-absorbent polymer powder stream are mixed while airborne to solidify the waste liquid particles without any physical mixing or agitation;

collecting a quantity of solidified waste liquid at a bottom portion of the mixing chamber; and ejecting the quantity of solidified waste liquid from the mixing chamber.

2. The method of claim 1, wherein the quantity of solidified waste liquid is ejected with the aid of a pressure generator to increase the pressure within the mixing chamber.

3. The method of claim 1, wherein the quantity of solidified waste liquid is ejected with the aid of a mechanical apparatus pressing upon the quantity of solidified waste liquid.

4. The method of claim 3, wherein the mechanical apparatus includes an annular piston, and the annular piston presses upon the quantity of solidified waste liquid to eject the quantity of solidified waste liquid from the mixing chamber.

5. The method of claim 1, further comprising utilizing automated batch control to start and/or stop a process of solidifying waste liquid provided to the mixing chamber.

* * * * *